Patented Mar. 21, 1939

2,151,331

UNITED STATES PATENT OFFICE 2,151,331

PROCESS FOR MAKING INSOLUBLE ANHYDRITE

Richard S. Roberts, Shaker Heights, Ohio, assignor, by mesne assignments, to E. I. du Pont de Nemours & Company, a corporation of Delaware No Drawing. Application July 5, 1935, Serial No. 30,046

9 Claims. (Cl. 23—122)

This invention refers to the production of calcium sulfate in a form suitable for pigment purposes, and more particularly to the manufacture of finely divided insoluble anhydrite from other forms of calcium sulfate.

The process comprises digesting a calcium sulfate of less than 6.2% combined water content and comprising soluble anhydrite in a dilute aqueous solution of an electrolyte at an elevated temperature. The product obtained in this manner is insoluble anhydrite, as has been determined by its specific X-ray diffraction pattern. A further result of this digestion is the conversion of the coarse crystals of the original calcium sulfate to particles of very small size.

It is known that there are at least four forms of calcium sulfate, namely, gypsum: $CaSO_4.2H_2O$; hemi-hydrate: $CaSO_4.1/2H_2O$; soluble and insoluble anhydrite: $CaSO_4$. The form which is often desired for pigment use is the insoluble anhydrite, when it exists in the form of very finely divided non-acicular crystals. Several more or less efficient ways have been proposed to produce this preferred form, among which are (1) the digestion of gypsum in a strongly dehydrating sulfuric acid solution containing at least 40% sulfuric acid (Br. Patent 319,228 and Fr. Patent 676,640 to Spence), (2) digestion of soluble anhydrite with sulfuric acid of at least 40% strength (Br. Patent 355,694 to Spence), and (3) precipitation of calcium sulfate in an excess of sulfuric acid (U. S. Patent 1,906,730 to Washburn and Aagaard).

Insoluble anhydrite has been produced by Van't Hoff and others by digesting gypsum at the boiling point in a dehydrating medium, such as a concentrated solution of calcium chloride or the like, but without any change taking place in the coarse, acicular crystal structure or particle size. The same conversion without change in crystal structure can be obtained by calcination at high temperatures.

The object of this invention is to produce insoluble anhydrite of extremely fine particle size and nonacicular character suitable for use as a pigment or pigment extender.

This object is accomplished by digesting a calcium sulfate containing less combined water than is present in hemi-hydrate, namely, less than 6.2%, or preferably less than 4% of combined water at elevated temperatures in water or in dilute solutions of certain compounds as described hereinafter. I have found that the resulting product is substantially all in the form of nonacicular insoluble anhydrite, and that the average particle size is exceedingly small, with very few particles considerable larger than the average, which material is eminently suited for use as a pigment, pigment extender, or filler in the pigment, paint, rubber, paper, etc. industries.

It is advantageous to use as a starting material calcium sulfate consisting principally or substantially of soluble anhydrite, such as can be obtained by dehydrating gypsum at about 160° C.

In the practical embodiment of my invention, I mix a calcium sulfate of less than 6.2% combined water content containing soluble anhydrite with an aqueous solution, such as is described below. The mixing is effected at a conveniently rapid rate, and the bath is stirred by a suitable agitator. The bath is preferably an aqueous solution of an electrolyte containing from 5 to 30% of sulfuric acid, 15% being the most convenient concentration, but it has been found that water or any aqueous solution which does not react with the calcium sulfate may be used. For example, water and water solutions of sodium chloride, hydrochloride acid, calcium chloride, and aluminum nitrate (plus sufficient nitric acid to prevent hydrolysis) have been used and found satisfactory. Such salts as sodium or potassium sulfate cannot be used, however, as they form double salts with calcium sulfate. Strong alkalis such as sodium hydroxide do not product complete disintegration of the needles of calcium sulfate. Barium compounds could not be used, for by double decomposition barium sulfate would be precipitated.

The bath is preferably held at its boiling point, but lower temperatures may be used. At the boiling point, the disintegration and the conversion to insoluble anhydrite take place more rapidly than at lower temperatures, and the product is also more resistant to hydration.

I have found that with baths of water a temperature as low as 90° C. will effect the disintegration. At lower temperatures the disintegration proceeds slowly and before it is complete large prismatic crystals begin to grow, so that the final product is very coarse if digestion is continued. The nature of the bath determines the minimum operating temperature. With very dilute sulfuric acid, e. g., 3%, the tendency to grow large prisms is quite pronounced, so that it is necessary for best results to operate at the boiling point of the bath.

The disintegration and conversion to insoluble anhydrite takes place in from ten to thirty minutes when operating under the preferred conditions, but I prefer to continue the digestion for about two hours in order to obtain a more stable product. The product must be sufficiently resistant to hydration to permit washing it.

When the digestion is completed, the product is filtered from the bath, and may then be treated as desired. Ordinarily, it would be washed with water until free of acid, or washed partly free with water and then neutralized with lime water. It may then be dried, preferably at a temperature above 150° C. so as to be sure that no rehydration will take place. Drying may be followed by calcination or the wet cakes from the washing operation may be fed directly to the calcining furnace to be dried and calcined.

The product obtained by this process is very finely divided and non-acicular in particle shape.

The following examples are to be regarded as illustrative only, and not as limiting the meaning or scope of the invention in any way.

*Example I.*—200 parts by weight of a calcium sulfate consisting of hemi-hydrate and soluble anhydrite, which had a combined water content of 3%, were suspended in boiling 15% sulfuric acid. The suspension was stirred and maintained at the boiling point for two hours. The slurry was then filtered and the filter cake washed and dried at about 160° C. The dry product consisted of insoluble anhydrite in the form of very fine particles and with excellent color and whiteness.

*Example II.*—200 grams of calcium sulfate consisting of hemi-hydrate and soluble anhydrite and containing 2% combined water were added to 2 liters of an aqueous solution of calcium chloride containing 220 grams of calcium chloride per liter maintained at the boiling point. After two hours digestion, during which the slurry was agitated, the product was filtered, washed, and dried at 160° C. The dry product was an insoluble anhydrite of fine particle size.

*Example III.*—2000 pounds of calcium sulfate consisting substantially of soluble anhydrite and containing less than 1% of combined water were added to a boiling bath consisting of 2400 gallons of 15% sulfuric acid. The bath was agitated during addition of the calcium sulfate, as well as during the subsequent digestion. The digestion was continued for two hours at the boiling point of the slurry, after which the product was filtered off and washed. After drying at 160° C. it constituted an insoluble anhydrite of fine particle size.

I claim:

1. A process for producing stable, pigment-useful insoluble anhydrite of finely-divided, non-acicular crystal form, comprising digesting and converting at an elevated temperature a substantially dry form of calcium sulfate of less than 6.2% combined water content and comprising soluble anhydrite, in a dilute aqueous sulfuric acid, the $H_2SO_4$ content of which is maintained at less than 15% during said digestion and conversion.

2. A process for producing stable, pigment-useful, insoluble anhydrite of finely-divided, non-acicular crystal form, comprising digesting and converting a substantially dry form of calcium sulfate containing less than 6.2% combined water content and comprising soluble anhydrite, in a dilute aqueous sulfuric acid at the boiling point the $H_2SO_4$ content of said acid being maintained at less than 15% during said digestion and conversion.

3. A process for producing stable, pigment-useful, insoluble anhydrite of finely-divided, non-acicular crystal form, comprising digesting and converting at an elevated temperature a substantially dry form of calcium sulfate of less than 4% combined water content and comprising soluble anhydrite, in a dilute aqueous sulfuric acid, the $H_2SO_4$ content of which is maintained at less than 15% during said digestion and conversion.

4. A process for producing stable, pigment-useful, insoluble anhydrite of finely-divided, non-acicular crystal form, comprising digesting and converting a substantially dry form of calcium sulfate containing less than 4% combined water content and comprising soluble anhydrite, in a dilute aqueous sulfuric acid at the boiling point, the $H_2SO_4$ content of said acid being maintained at less than 15% during said digestion and conversion.

5. A process for producing stable, pigment-useful, insoluble anhydrite of finely-divided, non-acicular crystal form, comprising digesting and converting at an elevated temperature a substantially dry form of calcium sulfate consisting substantially of soluble anhydrite, in a dilute aqueous sulfuric acid, the $H_2SO_4$ content of which is maintained at less than 15% during said digestion and conversion.

6. A process for producing stable, pigment-useful, insoluble anhydrite of finely-divided, non-acicular crystal form, comprising digesting and converting a substantially dry form of calcium sulfate consisting substantially of soluble anhydrite, in a dilute aqueous sulfuric acid at the boiling point, the $H_2SO_4$ content of said acid being maintained at less than 15% during said digestion and conversion.

7. A process for producing stable, pigment-useful, insoluble anhydrite of finely-divided, non-acicular crystal form, comprising digesting and converting at an elevated temperature a substantially dry form of calcium sulfate consisting substantially of soluble anhydrite, in a dilute aqueous solution of sulfuric acid, the $H_2SO_4$ content of which ranges from substantially 5% to 15% during digestion and conversion.

8. A process for producing stable, pigment-useful, insoluble anhydrite in finely-divided, non-acicular form, comprising mixing calcium sulfate consisting of hemihydrate and soluble anhydrite in substantially dry form with dilute aqueous sulfuric acid having an $H_2SO_4$ content not exceeding 15%, and digesting the resultant mixture at the boil until said calcium sulfate becomes converted to stable, water-resistant, insoluble anhydrite.

9. A process for producing stable, pigment-useful, insoluble anhydrite of finely-divided, non-acicular crystal form, comprising adding calcium sulfate consisting of hemihydrate and soluble anhydrite in substantially dry form to hot dilute aqueous sulfuric acid having an $H_2SO_4$ content not exceeding 15%, and digesting the resultant mixture at a temperature of 100° C. until said calcium sulfate becomes converted to stable, water-resistant, insoluble anhydrite.

RICHARD S. ROBERTS.

Henry Van Arsdale

CERTIFICATE OF CORRECTION.

Patent No. 2,151,331.   March 21, 1939.

RICHARD S. ROBERTS.

It is hereby certified that error appears in the printed specification of the above numbered patent requiring correction as follows: Page 1, second column, line 23, for the word "hydrochloride" read hydrochloric; line 29, for "product" read produce; and that the said Letters Patent should be read with this correction therein that the same may conform to the record of the case in the Patent Office.

Signed and sealed this 6th day of June, A. D. 1939.

(Seal)   Acting Commissioner of Patents.